Jan. 3, 1939.  P. KLAMP  2,142,946
DOUBLE ROW ROLLER BEARING
Filed April 4, 1938
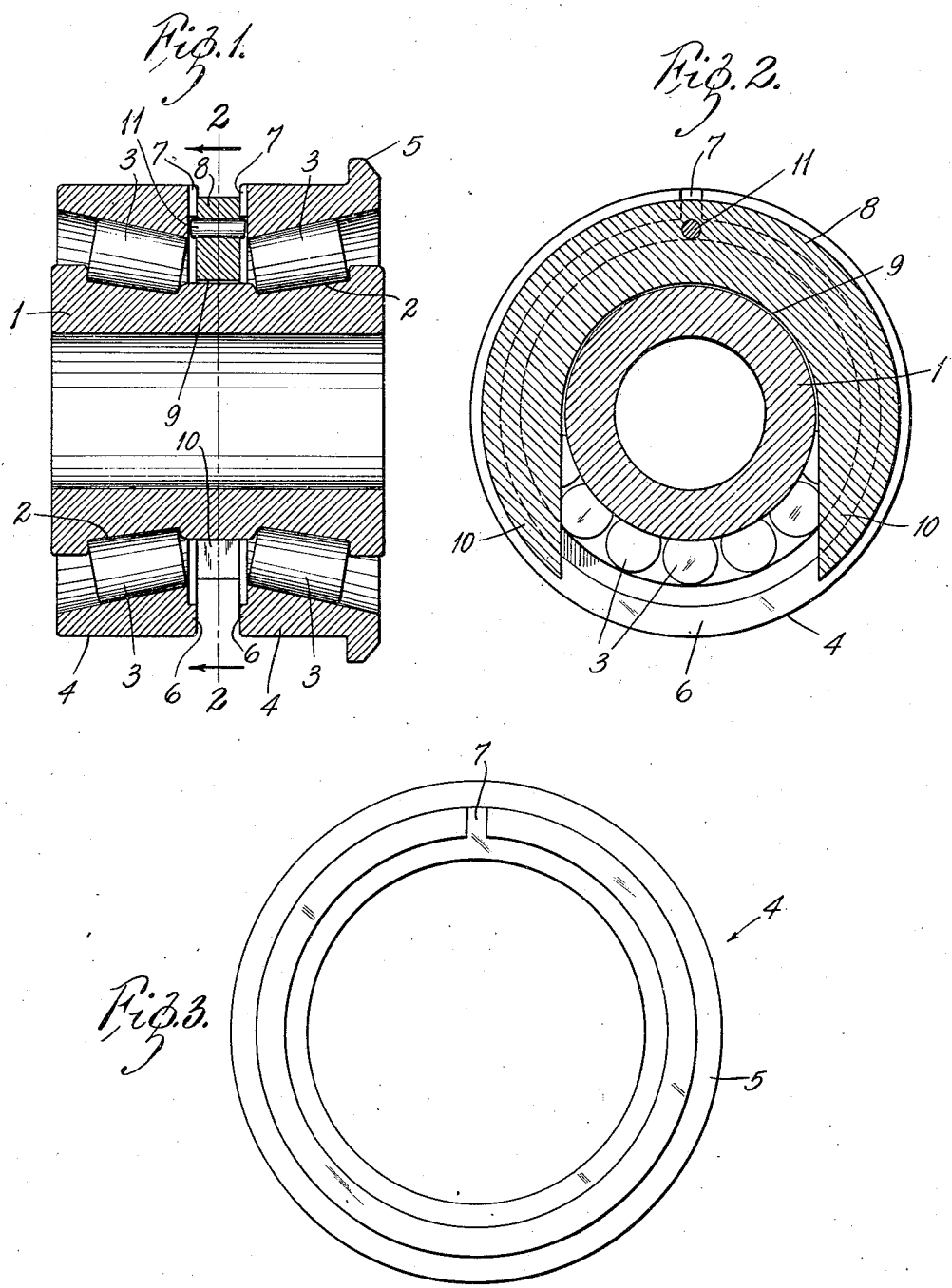
INVENTOR:
Paul Klamp,
by Carr Karr & Gravely
HIS ATTORNEYS.

Patented Jan. 3, 1939

2,142,946

UNITED STATES PATENT OFFICE 2,142,946

DOUBLE ROW ROLLER BEARING

Paul Klamp, Canton, Ohio, assignor to The Timken Roller Bearing Company, Canton, Ohio, a corporation of Ohio Application April 4, 1938, Serial No. 199,746

2 Claims. (Cl. 308—214)

My invention relates to roller bearings of the type having two series of rollers and separate outer bearing members therefor, means being provided between said outer bearing members for holding them in proper spaced running position. The invention has for its principal object a bearing of this type which is easy to assemble and disassemble, in which the outer bearing members are accurately positioned and in which accidental displacement of the positioning device is prevented.

The invention consists in the double row roller bearing and in the parts and combinations and arrangements of parts hereinafter described and claimed.

In the accompanying drawing,

Fig. 1 is a longitudinal sectional view of a rocker arm bearing embodying my invention;

Fig. 2 is a cross-sectional view on the line 2—2 in Fig. 1; and

Fig. 3 is an elevation of one of the outer bearing members.

The drawing illustrates a bearing comprising a double inner bearing member or cone 1 having conical raceways 2 thereon that taper toward the middle of the bearing, two series of taper bearing rollers 3 and a separate outer bearing member or cup 4 for each series of rollers, one of said cups being shown as provided with a peripheral flange 5 for abutment against the face or shoulder of a suitable mounting member, as a rocker arm. The present invention is concerned with the means for holding the bearing cups in proper spaced running position.

The opposed inner end faces of the cups are provided with annular ribs 6 that stop short of the inner margins of said end faces. A radial slot 7 extends through each of said annular ribs. A substantially C-shaped washer 8 of a thickness necessary to space the bearing cups the proper distance apart is mounted between the opposed end faces of said cups. Said washer has a semi-circular opening 9 of such diameter that it fits loosely over the middle portion of the bearing cone and the inner margins of the jaws or arms 10 of said washer extend tangentially from the ends of said semi-circular opening, so that the washer may be slipped freely over the cone.

Opposite its open end, said washer is provided with a pin 11 that projects from each face thereof; and by turning the cups so that the two radial slots are opposed to each other, the projections of the pin may be passed through said slots to permit proper positioning of the washer between the cups and on the cone. The pin is so located in the washer as to lie just within the circle formed by the inner periphery of the annular rib. By turning one cup relative to the other, so as to bring said slots out of alinement, accidental disassembly of the parts will be prevented. Disassembly, when desired, is easily accomplished by bringing the slots into opposed relation again and withdrawing the washer, the ends of the pin passing through said slots.

The above described construction is easy to assemble and disassemble, proper running clearance is obtained by the selection of the proper sized spacing washer and adjustment may be obtained by inserting a larger washer.

What I claim is:

1. A double row roller bearing comprising two annular series of rollers, a separate bearing cup for each series of rollers, said cups being disposed with their opposed ends spaced apart, each of said opposed ends having an annular marginal rib each having a radial slot, an open ended spacing washer interposed between said ribs and a pin projecting from each face of said washer opposite said open end, whereby said washer may be positioned by passing said pin between the alined slots and then causing relative movement to bring the pin clear of the slots, thereby holding said washer by engagement of the pin in said ribs.

2. A double row roller bearing comprising two annular series of rollers, a bearing cone having raceways for said rollers and a cylindrical portion between said raceways, a separate bearing cup for each series of rollers, said cups being disposed with their opposed ends spaced apart, each of said opposed ends having an annular marginal rib each having a radial slot, substantially C-shaped spacing washer interposed between said ribs, said washer having a semi-circular opening therein large enough in diameter to fit loosely over said cylindrical portion of said cone and jaws whose inner margins extend tangentially from the ends of said opening, and a pin projecting from each face of said washer opposite its open end, whereby said washer may be positioned by passing said pin between the alined slots and then causing relative movement to bring the pin clear of the slots, thereby holding said washer by engagement of the pin in said ribs.

PAUL KLAMP.